(12) United States Patent
Abe et al.

(10) Patent No.: US 10,707,687 B2
(45) Date of Patent: Jul. 7, 2020

(54) CHARGE/DISCHARGE CONTROL CIRCUIT AND BATTERY APPARATUS HAVING THE SAME

(71) Applicant: ABLIC Inc., Chiba-shi, Chiba (JP)

(72) Inventors: Satoshi Abe, Chiba (JP); Takashi Ono, Chiba (JP)

(73) Assignee: ABLIC INC., Chiba (JP)

( * ) Notice: Subject to any disclaimer, the term of this patent is extended or adjusted under 35 U.S.C. 154(b) by 0 days.

(21) Appl. No.: 16/156,465

(22) Filed: Oct. 10, 2018

(65) Prior Publication Data

US 2019/0115771 A1    Apr. 18, 2019

(30) Foreign Application Priority Data

Oct. 13, 2017   (JP) .................................. 2017-198968

(51) Int. Cl.
*H02J 7/00* (2006.01)
(52) U.S. Cl.
CPC ............ *H02J 7/0029* (2013.01); *H02J 7/008* (2013.01); *H02J 7/0031* (2013.01); *H02J 7/0068* (2013.01); *H02J 7/00306* (2020.01)
(58) Field of Classification Search
CPC ...... H02J 7/0029; H02J 7/0031; H02J 7/0068; H02J 7/008; H02J 2007/004; H02J 2007/0037; H02J 7/0036; H02J 7/0026; H02J 7/00306; H02J 7/00302
See application file for complete search history.

(56) References Cited

U.S. PATENT DOCUMENTS

| | | | | |
|---|---|---|---|---|
| 7,855,531 | B2 * | 12/2010 | Zhang | H01M 10/44 320/134 |
| 8,471,530 | B2 * | 6/2013 | Yoshikawa | H02J 7/0031 320/134 |
| 10,116,148 | B2 * | 10/2018 | Kubota | H02J 7/0029 |
| 2002/0079869 | A1 * | 6/2002 | Fujiwara | H02J 7/0031 320/157 |
| 2005/0182987 | A1 * | 8/2005 | Sakurai | G06F 1/28 713/340 |
| 2005/0242779 | A1 * | 11/2005 | Yoshio | H02J 7/0031 320/134 |
| 2008/0203971 | A1 * | 8/2008 | Sakurai | H02J 7/0034 320/134 |
| 2009/0072790 | A1 * | 3/2009 | Ibrahim | H02J 7/0031 320/134 |

(Continued)

FOREIGN PATENT DOCUMENTS

JP    2005-229774    8/2005

*Primary Examiner* — Nha T Nguyen
(74) *Attorney, Agent, or Firm* — Brinks Gilson & Lione

(57) ABSTRACT

There are provided a charge/discharge control circuit and a battery apparatus to which a load having a large capacitance is connected. In the battery apparatus, the charge/discharge control circuit includes an overdischarge latch circuit providing an overdischarge latch signal, based on a discharge control signal supplied thereto and a voltage of an external negative voltage input terminal, and a logic circuit supplied with an overdischarge detection signal and the overdischarge latch signal and providing the overdischarge detection signal to a control circuit while receiving the overdischarge latch signal, to thereby enable the power supply to the load to stop in a short processing time.

6 Claims, 3 Drawing Sheets

(56) References Cited

U.S. PATENT DOCUMENTS

| | | | |
|---|---|---|---|
| 2009/0200986 A1* | 8/2009 | Kopera | H01M 10/486 |
| | | | 320/134 |
| 2010/0188044 A1* | 7/2010 | Yamamoto | H01M 2/34 |
| | | | 320/118 |
| 2012/0313574 A1* | 12/2012 | Maetani | H02J 7/008 |
| | | | 320/107 |
| 2017/0005490 A1* | 1/2017 | Saito | H02J 7/0026 |

* cited by examiner

CHARGE/DISCHARGE CONTROL CIRCUIT AND BATTERY APPARATUS HAVING THE SAME

RELATED APPLICATIONS

This application claims priority under 35 U.S.C. § 119 to Japanese Patent Application No. 2017-198968 filed on Oct. 13, 2017, the entire content of which is hereby incorporated by reference.

BACKGROUND OF THE INVENTION

1. Field of the Invention

The present invention relates to a charge/discharge control circuit and a battery apparatus having the same.

2. Description of the Related Art

In general, a battery apparatus is configured to have a charge/discharge control circuit detecting overcharge, overdischarge, etc., to control charge/discharge of a secondary cell and thereby protect the secondary cell. Further, the battery apparatus has a power-down function of, prohibiting discharge to a load and reducing current consumption inside the charge/discharge control circuit at detection of the overdischarge.

A block diagram of a battery apparatus 50 of related art is illustrated in FIG. 3. The battery apparatus 50 includes a secondary cell SC, a charge/discharge control circuit 51 connected to the secondary cell SC, a discharge control FET52, a charge control FET53, an external positive terminal EB+, and an external negative terminal EB−.

The charge/discharge control circuit 51 has an overcharge detection circuit 511, an overdischarge detection circuit 512, a control circuit 513, a pull-up detection circuit 514, a positive power supply terminal VDD, a negative power supply terminal VSS, a discharge control terminal DO, a charge control terminal CO, and an external negative voltage input terminal VM. Each circuit and each terminal are connected as illustrated in the drawing.

In the battery apparatus 50, when the voltage of the secondary cell SC reduces and the overdischarge detection circuit 512 detects overdischarge, the control circuit 513 turns off the discharge control FET52 through the discharge control terminal DO. At this time, the voltage of the external negative voltage input terminal VM rises to near a voltage at the external positive terminal EB+, i.e., the positive terminal of the secondary cell SC by a load. As for the control circuit 513, when the pull-up detection circuit 514 detects that the voltage of the external negative voltage input terminal VM exceeds a power-down voltage, the pull-up detection circuit 514 outputs a pull-up signal to the control circuit 513. In response to the pull-up signal, the control circuit 513 outputs a power-down control signal to the overcharge detection circuit 511 and the overdischarge detection circuit 512. Then, the battery apparatus 50 enters a power-down state. As long as it is not detected that the voltage of the external negative voltage input terminal VM has reached a voltage equal to or lower than the power-down voltage, even if the voltage of the secondary cell SC rises, the battery apparatus 50 brought into the power-down state is not released from the power-down state Release of the battery apparatus from the power-down state is not performed only by the rise of the voltage of the secondary battery cell SC, but the detection that the voltage of the external negative voltage input terminal VM has reduced to the power-down voltage or lower should also be made (refer to, for example, Patent Document 1).

According to the battery apparatus 50 having such a charge/discharge control circuit 51, in order to reduce unnecessary power consumption at the time of product shipment, the battery apparatus 50 is brought into the power-down state to stop the current flow through the load. For example, the voltage of the positive power supply terminal VDD is artificially made low by a switch 56 and resistors 54 and 55 provided at the positive power supply terminal VDD to enable the battery apparatus 50 to be brought into the power-down state.

SUMMARY OF THE INVENTION

The battery apparatus 50 illustrated in FIG. 3 however performs the following operation.

In a shipment inspection of a product to which a non-removable load is connected, the switch 56 is turned on to artificially set the voltage of the positive power supply terminal VDD low, thereby bringing the battery apparatus 50 into the power-down state. In this case it may take a long time until the voltage of the external negative voltage input terminal VM exceeds the power-down voltage when the capacitance of the load is large even if the discharge control FET52 is turned off.

Thus, the battery apparatus 50 does not enter the power-down state when the switch 56 is turned off before the voltage of the external negative voltage input terminal VM exceeds the power-down voltage. That is, the switch 56 should be kept on until the voltage of the external negative voltage input terminal VM exceeds the power-down voltage. Procedure included in such a shipment inspection is required to be executable in a short period of time because a processing time is taken for the cost of each product.

The present invention has been made to provide a charge/discharge control circuit capable of stopping the load in a short processing time in a battery apparatus connected with a load whose capacitance is large, and a battery apparatus including the charge/discharge control circuit.

According to one aspect of the present invention there is provided a charge/discharge control circuit which controls charge/discharge of a secondary cell, including: a positive power supply terminal and a negative power supply terminal configured to monitor a voltage of the secondary cell; an external negative voltage input terminal configured to be supplied with a voltage of an external negative terminal to which a negative electrode of a load is connected; a discharge control terminal configured to output a discharge control signal to a discharge control FET; an overdischarge detection circuit configured to output an overdischarge detection signal at detection of overcharge of the secondary cell according to a voltage of the positive power supply terminal; a control circuit configured to output an overdischarge state signal and the discharge control signal, based on the overdischarge detection signal; an overdischarge latch circuit configured to output an overdischarge latch signal, based on the overdischarge state signal and the voltage of the external negative voltage input terminal; and a logic circuit to which the overdischarge detection signal and the overdischarge latch signal are supplied, and configured to output the overdischarge detection signal to the control circuit while receiving the overdischarge latch signal.

Further, a battery apparatus of the present invention is equipped with a secondary cell, an external positive terminal and an external negative terminal connected with a load, a charge control FET having one end connected to the external negative terminal, a discharge control FET having one end connected to the other end of the charge control FET, and the other end of the discharge control FET connected to a negative electrode of the secondary cell, and the charge/discharge control circuit connected to the secondary cell, the charge control FET, the discharge control FET, and the external negative terminal.

According to the present invention, a current flow through the load can be stopped in a short processing time in a battery apparatus to which a load having a large capacitance is connected since there are provided an overdischarge latch circuit which outputs an overdischarge latch signal based on a discharge control signal and a voltage of an external negative voltage input terminal, and a logic circuit to which an overdischarge detection signal and the overdischarge latch signal are supplied and which outputs the overdischarge detection signal to a control circuit while receiving the overdischarge latch signal.

DETAILED DESCRIPTION OF THE PREFERRED EMBODIMENTS

Embodiments of the present invention will hereinafter be described with reference to the accompanying drawings.

Figure 1:
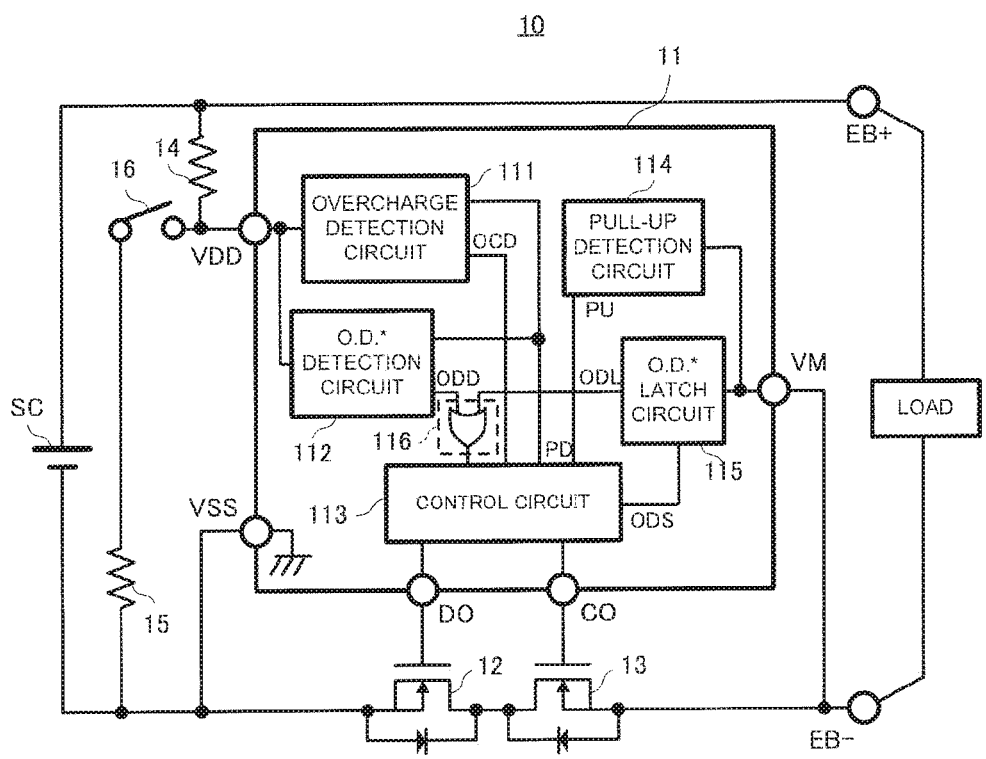
FIG. 1 is a block diagram illustrating an example of a battery apparatus according to an embodiment of the present invention.

FIG. 1 is a block diagram illustrating a battery apparatus 10 according to an embodiment of the present invention.

The battery apparatus 10 according to the present embodiment is equipped with a secondary cell SC, a charge/discharge control circuit 11, a discharge control FET12, a charge control FET13, resistors 14 and 15, a switch 16, and an external positive terminal EB+ and an external negative terminal EB− to which a load or a charger is connected.

The charge/discharge control circuit 11 includes an overcharge detection circuit 111, an overdischarge detection circuit 112, a control circuit 113, a pull-up detection circuit 114, an overdischarge latch circuit 115, a logic circuit 116, a positive power supply terminal VDD and a negative power supply terminal VSS, a discharge control terminal DO, a charge control terminal CO, and an external negative voltage input terminal VM.

The charge control FET13 has one end connected to the external negative terminal EB−, and the other end connected to one end of the discharge control FET12. The discharge control FET12 has the other end connected to a negative electrode of the secondary cell SC. The discharge control FET12 has a gate connected to the discharge control terminal DO and on/off of the discharge control FET12 is controlled by a discharge control signal therefrom. The charge control FET13 has a gate connected to the charge control terminal CO and on/off of the charge control FET13 is controlled by a charge control signal therefrom.

The charge/discharge control circuit 11 has the positive power supply terminal VDD connected to a positive electrode of the secondary cell SC and the external positive terminal EB+ through the resistor 14, the negative power supply terminal VSS connected to the negative electrode of the secondary cell SC, and the external negative voltage input terminal VM connected to the external negative terminal EB−.

The overcharge detection circuit 111 detects overcharge of the secondary cell SC from a voltage of the positive power supply terminal VDD and outputs an overcharge detection signal OCD to the control circuit 113. The overdischarge detection circuit 112 detects overdischarge of the secondary cell SC from the voltage of the positive power supply terminal VDD and outputs an overdischarge detection signal ODD to the logic circuit 116. Here a voltage of the negative power supply terminal VSS is provided to these circuits, but the detail is omitted in the drawing. Hereinafter, the same also applies to other circuits.

The control circuit 113 outputs a discharge control signal of a high level to the discharge control terminal DO for permission of the discharge of the secondary cell SC, and outputs a discharge control signal of a low level for prohibition of the discharge thereof. The control circuit 113 outputs a charge control signal of a high level to the charge control terminal CO for permission of the charge of the secondary cell SC, and outputs a charge control signal of a low level for prohibition of the charge thereof. Further, receiving the overdischarge detection signal ODD, the control circuit 113 outputs an overdischarge state signal ODS after a prescribed delay time and thereafter on receiving a pull-up signal PU, the control circuit 113 outputs a power-down control signal PD to the overcharge detection circuit 111 and the overdischarge detection circuit 112.

The pull-up detection circuit 114 is supplied with a voltage of the external negative voltage input terminal VM therein, and outputs the pull-up signal PU after detection that the external negative terminal EB− is pulled up to the external positive terminal EB+ by the load so that a voltage of the external positive terminal EB+ exceeds a power-down voltage.

The overdischarge latch circuit 115 is supplied with the overdischarge state signal ODS and the voltage of the external negative voltage input terminal VM, and outputs an overdischarge latch signal ODL to the logic circuit 116. In the overdischarge latch circuit 115 the input of the overdischarge state signal ODS causes the output of the overdischarge latch signal ODL when the voltage of the external negative voltage input terminal VM is higher than a prescribed voltage. And the output of the overdischarge latch signal ODL is stopped when the voltage of the external negative voltage input terminal VM reaches a voltage equal to or lower than the prescribed voltage. The prescribed voltage is, for example, a voltage at which the connection of the charger to the external positive terminal EB+ and the external negative terminal EB− can be detected.

The logic circuit 116 is supplied with the overdischarge detection signal ODD and the overdischarge latch signal ODL, and outputs the output signal of the overdischarge detection circuit 112 to the control circuit 113 when the overdischarge latch signal ODL is absent. The logic circuit 116 outputs the overdischarge detection signal ODD to the control circuit 113 while receiving the overdischarge latch signal ODL. The logic circuit 116 is composed of, for example, an OR circuit.

Next, the operation of the battery apparatus 10 will be described below.

A description will be made here about the operation of the battery apparatus 10 in which the load having a large capacitance is connected between the external positive terminal EB+ and the external negative terminal EB−, and the switch 16 and the resistor 15 are connected between the positive power supply terminal VDD and the negative electrode of the secondary cell SC, in which the battery apparatus 10 forcibly stops the power supply to the load to enter a power-down state. The secondary cell SC is assumed to be charged to a voltage of such an extent as not to exceed the overcharge voltage, and the discharge control FET12 and the charge control FET13 are assumed to be turned on.

Turning on of the switch 16 supplies a voltage which is obtained by dividing the voltage of the secondary cell SC by the resistors 14 and 15 to the positive power supply terminal VDD. The resistance of the resistors 14 and 15 are set in such a manner that the divided voltage falls below an overdischarge voltage. Thus, the overdischarge detection circuit 112 detects the overdischarge of the secondary cell SC and outputs an overdischarge detection signal ODD to the control circuit 113 through the logic circuit 116. Upon receipt of the overdischarge detection signal ODD, the control circuit 113 outputs a discharge control signal of a low level to the discharge control terminal DO after a prescribed delay time to turn off the discharge control FET12, thereby prohibiting discharge, and further outputs an overdischarge state signal ODS to the overdischarge latch circuit 115.

When the discharge control FET12 is turned off, the external negative terminal EB− is cut off from the connection with the negative electrode of the secondary cell SC and pulled up to the external positive terminal EB+ by the load. Since the capacitance of the load is, however, large, the voltage of the external negative terminal EB− is pulled up to the voltage of the external positive terminal EB+ over a long time (few seconds, for example). Thus, the pull-up detection circuit 114 does not output a pull-up signal PU until the voltage of the external negative voltage input terminal VM exceeds a power-down voltage.

Now, when the overdischarge latch circuit 115 receives the overdischarge state signal ODS of the control circuit 113, the overdischarge latch circuit 115 outputs an overdischarge latch signal ODL since the voltage of the external negative voltage input terminal VM is higher than a prescribed voltage. Then, the overdischarge latch signal ODL is maintained until the charger is connected between the external positive terminal EB+ and the external negative terminal EB−.

The logic circuit 116 outputs the overdischarge detection signal ODD to the control circuit 113 while receiving the overdischarge latch signal ODL. Then, the switch 16 is turned off so that the overdischarge detection signal ODD is not supplied from the overdischarge detection circuit 112, the logic circuit 116 still continues to output the overdischarge detection signal ODD.

The control circuit 113 outputs a discharge control signal of a low level while receiving the overdischarge detection signal ODD. Thus, the battery apparatus 10 is capable of stopping the power supply to the load to reduce unnecessary current consumption. The voltage of the external negative voltage input terminal VM only needs to exceed the power-down voltage while the overdischarge latch signal ODL is supplied from the overdischarge latch circuit 115. Further, when the voltage of the external negative voltage input terminal VM exceeds the power-down voltage, the pull-up detection circuit 114 outputs a pull-up signal PU, and the control circuit 113 outputs a power-down control signal PD to the overcharge detection circuit 111 and the overdischarge detection circuit 112, whereby the battery apparatus 10 enters a power-down state.

Thus, the switch 16 needs not to be kept on during a period until the pull-up detection circuit 114 outputs the pull-up signal PU, but may only be kept on during a period until the overdischarge latch circuit 115 outputs the overdischarge latch signal ODL. Accordingly, as long as the switch 16 is devised to keep on only during the period until the overdischarge latch circuit 115 outputs the overdischarge latch signal ODL, the battery apparatus 10 is capable of forcibly stopping the power supply to the load and entering the power-down state.

As described above, according to the charge/discharge control circuit 11 of the present embodiment, the overdischarge latch circuit 115 and the logic circuit 116 are provided, thereby making it possible to stop the power supply to the load in a short processing time and enabling transition to the power-down state. Thus, it is possible to provide a battery apparatus low in manufacture cost.

In the present embodiment, the overdischarge latch circuit 115 may be composed of a voltage detection circuit which detects the voltage of the external negative voltage input terminal VM being higher than the prescribed voltage, and a logic circuit which outputs the overdischarge latch signal ODL, based on a detection signal of the voltage detection circuit and the overdischarge state signal ODS. Further, the overdischarge latch circuit 115 may be configured to be provided with the pull-up signal PU and the power-down control signal PD and thereby powered down.

Figure 2:
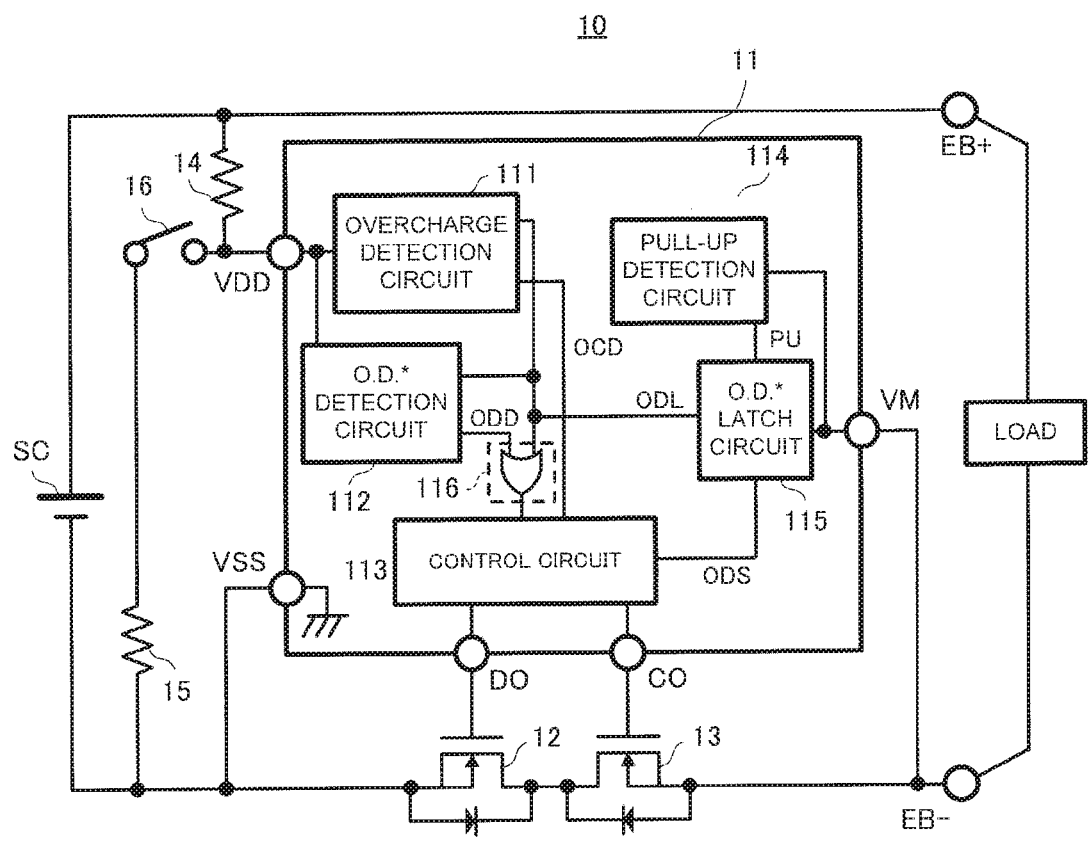
FIG. 2 is a block diagram illustrating another example of the battery apparatus according to the embodiment of the present invention.
Figure 3:
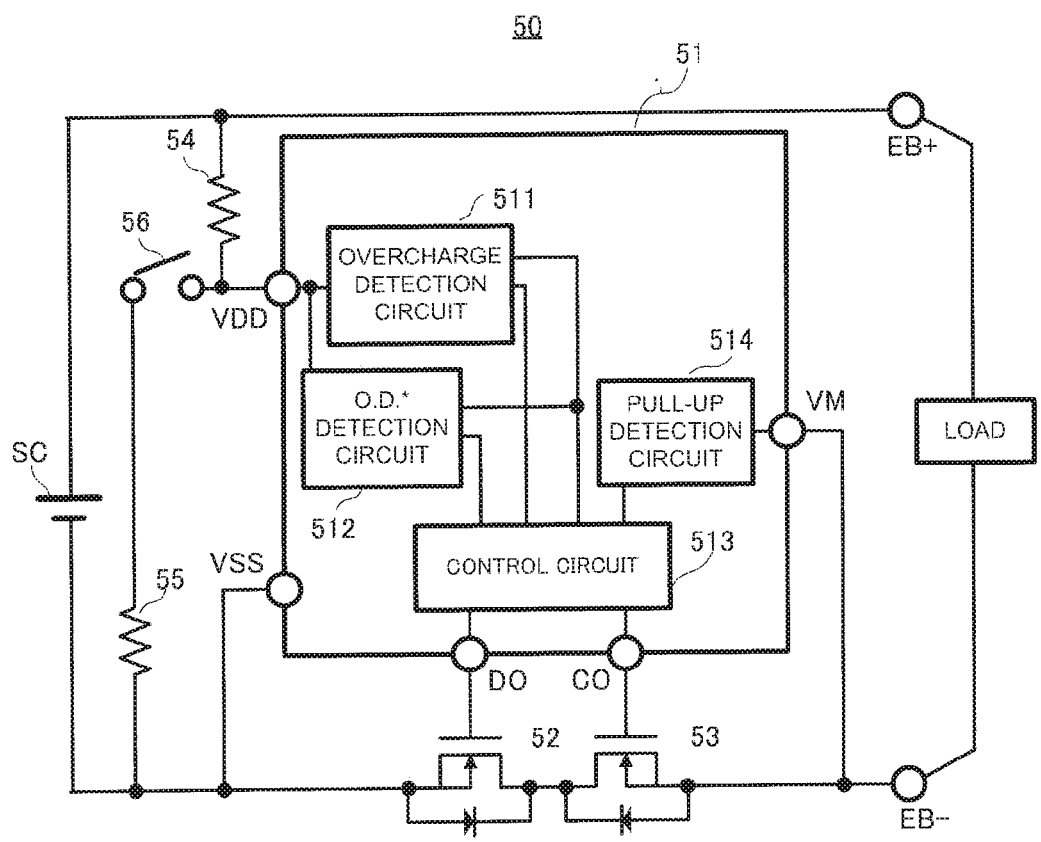
FIG. 3 is a block diagram illustrating a battery apparatus of related art.

Incidentally, although the control circuit 113 has output the power-down control signal PD to the overcharge detection circuit 111 and the overdischarge detection circuit 112 in accordance with the pull-up signal PU in the present embodiment, the overcharge detection circuit 111 and the overdischarge detection circuit 112 may be powered down by an overdischarge latch signal ODL as illustrated in FIG. 2. In that case, the overdischarge latch circuit 115 may be configured to be provided with a pull-up signal PU and thereby powered down.

Although the embodiments of the present invention have been described above, the present invention is not limited to the above embodiments. It is needless to say that various changes and combinations can be made thereto within the scope not departing from the spirit of the present invention.

For example, although the logic circuit 116 has been described as the OR circuit, it may be designed as appropriate according to the output logic of each circuit. Also, a circuit powered down by the power-down control signal PD or the overdischarge latch signal ODL may also be selected as appropriate. Further, the pull-up detection circuit is not particularly needed merely to stop the power supply to the load.

What is claimed is:

1. A charge/discharge control circuit which controls charge/discharge of a secondary cell, comprising:
a positive power supply terminal and a negative power supply terminal configured to monitor a voltage of the secondary cell;
an external negative voltage input terminal configured to receive a voltage of an external negative terminal to which a negative electrode of a load is connected;
a discharge control terminal configured to output a discharge control signal to a discharge control FET;
an overdischarge detection circuit configured to output an overdischarge detection signal at detection of overdischarge of the secondary cell according to a voltage of the positive power supply terminal;

a control circuit configured to output an overdischarge state signal and the discharge control signal, based on the overdischarge detection signal;

an overdischarge latch circuit configured to output an overdischarge latch signal, based on the overdischarge state signal and the voltage of the external negative voltage input terminal;

a logic circuit configured to receive the overdischarge detection signal and the overdischarge latch signal and output the overdischarge detection signal to the control circuit while receiving the overdischarge latch signal; and a pull-up detection circuit configured to monitor the voltage of the external negative voltage input terminal and thereby output a pull-up signal, wherein the control circuit outputs a power-down control signal based on the pull-up signal input to the control circuit, and wherein the overdischarge detection circuit enters a power-down state based on one of the power-down control signal and the overdischarge latch signal.

2. The charge/discharge control circuit according to claim 1, wherein the overdischarge latch circuit outputs the overdischarge latch signal in response to an input of the overdischarge state signal when a voltage of the external negative voltage input terminal is higher than a prescribed voltage, and the overdischarge latch circuit stops the output of the overdischarge latch signal when the voltage of the external negative voltage input terminal becomes equal to or lower than the prescribed voltage.

3. A battery apparatus comprising:
a secondary cell;
an external positive terminal and an external negative terminal connected with a load;
a charge control FET having one end connected to the external negative terminal;
a discharge control FET having one end connected to the other end of the charge control FET, and the other end of the discharge control FET connected to a negative electrode of the secondary cell; and
a charge/discharge control circuit according to claim 2 connected to the secondary cell, the charge control FET, the discharge control FET, and the external negative terminal.

4. The charge/discharge control circuit according to claim 1, wherein the overdischarge latch circuit enters a power-down state based on one of the pull-up signal and the power-down control signal.

5. A battery apparatus comprising:
a secondary cell;
an external positive terminal and an external negative terminal connected with a load;
a charge control FET having one end connected to the external negative terminal;
a discharge control FET having one end connected to the other end of the charge control FET, and the other end of the discharge control FET connected to a negative electrode of the secondary cell; and
a charge/discharge control circuit according to claim 4 connected to the secondary cell, the charge control FET, the discharge control FET, and the external negative terminal.

6. A battery apparatus comprising:
a secondary cell;
an external positive terminal and an external negative terminal connected with a load;
a charge control FET having one end connected to the external negative terminal;
a discharge control FET having one end connected to the other end of the charge control FET, and the other end of the discharge control FET connected to a negative electrode of the secondary cell; and
a charge/discharge control circuit according to claim 1 connected to the secondary cell, the charge control FET, the discharge control FET, and the external negative terminal.

* * * * *